United States Patent Office 3,718,638
Patented Feb. 27, 1973

3,718,638
PROCESS FOR THE POLYMERIZATION OF CONJUGATED DIENES
Tai Chun Cheng, Mogadore, and Adel F. Halasa, Bath, Ohio, assignors to The Firestone Tire & Rubber Company, Akron, Ohio
No Drawing. Continuation-in-part of application Ser. No. 854,309, Aug. 29, 1969. This application June 7, 1971, Ser. No. 150,735
Int. Cl. C08d *1/20, 3/04, 3/06*
U.S. Cl. 260—94.2 T
17 Claims

ABSTRACT OF THE DISCLOSURE

Conjugated dienes are polymerized by a new catalyst system which permits control of the molecular weight and gives a more easily processed product, together with an increased proportion of 1,2 configuration in the polymer repeating unit structure. This catalyst system comprises (1) a sodium allyl compound having 3–10 carbon atoms, (2) a sodium alkoxide or aryloxide of 1–10 carbon atoms, and (3) a potassium t-alkoxide of 4–10 carbon atoms. The diene polymers produced by this process have controllable molecular weights in the range of 5,000 to 1,000,000, preferably 100,000 to 500,000, broad molecular weight distribution, glass transition temperatures higher than normally obtained, high degree of branching, high proportion of 1,2 repeating unit configuration, and are more easily processed in the production of rubber and other compositions for commercial use.

This application is a continuation-in-part of copending application Ser. No. 854,309, filed Aug. 29, 1969, now abandoned.

BACKGROUND OF THE INVENTION

Field of the invention

This invention relates to a process for the polymerization of dienes using a catalyst composition comprising a sodium allyl compound, a sodium alkoxide or aryloxide and a potassium t-alkoxide.

Related prior art

The polymerization of conjugated dienes can be effected in a variety of methods. However, there are various disadvantages in the various methods presently known including undesirable or uncontrollable properties in the products, such as lack of control of molecular weight, molecular weight distribution and processibility of the polymers. For example, the so-called "Alfin" catalyst system which has been studied extensively produces polybutadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, vol. 94, October 1963, pp. 87–92.

This Alfin catalyst system effects very rapid formation of a very high molecular weight polymer having molecular weights of about 5,000,000 with about 75% of the polymer in the trans-1,4 configuration. In contrast, polymerization by an alkyl sodium, such as amyl sodium, produces a much slower polymerization reaction to give a polymer having as high as 70% in the 1,2 configuration, but with a molecular weight too low for the desired properties.

Burke U.S. Pat. No. 2,797,208 shows such Alfin catalyst systems in which the same alkali metal is used in the alkoxide modifier as in the allyl metal compound. In each case the resultant polymers are in the 1–10 million molecular weight range.

Morton, in Encyclopedia of Polymer Science & Technology (1964), vol. I, pages 629–638, in a discussion of Alfin catalysts resorts to the use of Na t-butoxide, but this is highly ineffective since the yield is only 7% as compared to 76% when sodium isopropoxide is used with the sodium allyl.

Polybutadienes prepared by the use of n-butyl lithium in n-hexane have about 8–10% 1,2-, 53–54% trans-1,4 and 35–37% cis-1,4 configurations, which polymers do not have enough 1,2 configuration for the desired properties. By using polar modifiers or solvents, such as ether, amines, etc., the vinyl content can be increased to up to 50–70%. However, the molecular weight distribution in such cases is so narrow as to give poor processibility. Moreover, the polar modifiers act as chain terminators and prevent active polymer products that might be coupled or otherwise post-treated to improve processibility. Processibility is very important for commercial rubber tire production. Among other disadvantages poor processibility results in poor adhesion to fillers and thereby gives poor reinforcement.

High glass transition temperatures in butadiene polymers generally indicate and accompany good wet traction. Butadiene emulsion polymers have low glass transition temperatures and have poor wet traction when fabricated into tires.

SUMMARY OF THE INVENTION

In accordance with the present invention, it has now been found that conjugated diene polymers of controllable molecular weight, broad molecular weight distribution, good processibility, high glass transition temperatures and good wet traction are produced by use of a catalyst system comprising the combination of (1) a sodium allyl compound having 3–10 carbon atoms, (2) a sodium alkoxide of 1–10 carbon atoms, preferably a secondary alkoxide, and (3) a potassium t-alkoxide. A fourth component, namely a sodium halide, can be present in the catalyst system depending on the method used in preparing the sodium allyl compound.

The presence of the potassium t-alkoxide effects a reduction of the molecular weight of the product from about 5,000,000 to about 500,000 and of the dilute solution viscosity from about 13 to about 3, and increases the vinyl content from about 20% up to 35–50% or higher.

The hydrocarbon portion of the sodium allyl compound has 3–10 carbon atoms, and even though larger groups can be used, there is no particular advantage. The sodium can be attached to a primary, secondary or tertiary carbon atom.

These can be prepared by the reaction of metallic sodium with an alkyl halide, and propylene reacted with the resultant sodium alkyl to give the sodium allyl compound and an alkane corresponding to the alkyl group used. In cases where it is desired to prepare the sodium hydrocarbon free of the byproduct sodium halide, this can be done by preparing it in a liquid which is a solvent for the sodium hydrocarbon but not for the sodium halide, such as diethyl ether, tetrahydrofuran, or other ether. Or after preparation in a hydrocarbon medium the sodium alkyl or allyl can be extracted in an ether solvent. Then after the salt has been separated from the solution by decantation or filtration, a higher boiling hydrocarbon is added and the ether removed by distillation, using reduced pressure to keep the temperature low.

In the sodium alkoxide, the hydrocarbon portion advantageously has 1 to 10 carbon atoms. While even larger groups can be used, again there is no added advantage, and such resultant compounds are more sluggish in their activity. The sodium alkoxide is prepared by the reaction of metallic sodium with an alcohol. This can be prepared separately and excess sodium is used to insure that no unreacted alcohol remains to react with the intermediate sodium hydrocarbon or with the sodium allyl compound upon mixture of the alkoxide therewith. Some sodium alkoxides, such as t-butoxide, are available commercially.

The potassium t-alkoxide is prepared by the reaction of metallic potassium with a tertiary alcohol. This is advantageously prepared separately, and excess potassium is used to insure that no unreacted alcohol remains to react with the intermediate sodium hydrocarbon or with the sodium allyl compound upon mixture of the potassium alkoxide therewith. Some potassium t-alkoxides, such as t-butoxide, are available commercially.

In this catalyst combination, the system is most active when there is one mole of sodium alkoxide per mole of the sodium allyl compound. If there is less than a 0.5 mole per mole ratio, the catalyst is unsuitable and if there is a considerable excess of the alkoxide over a 2.5–1 mole ratio, the catalyst is much less effective compared with the 1–1 optimum ratio. However, as the ratio decreases or increases from this optimum amount, there is some activity, since there will be at least a portion of the sodium allyl compound associated with one mole of the alkoxide. Consequently, it is desirable to keep within the range of 0.5–2.5 moles of sodium alkoxide per mole of sodium allyl compound.

The potassium t-alkoxide is used in a proportion of 0.4 to 2.28 preferably 0.6 to 1 mole per mole of sodium allyl compound.

If a sodium halide is present, it is generally in the amount deposited by the reaction of sodium with the halohydrocarbon by which the sodium hydrocarbon intermediate is formed, so that generally there is a mole of sodium halide per mole of sodium allyl. The halide is generally the chloride or bromide, since these are more economical than the fluoride and iodide.

The catalyst can be prepared at room temperature, but preferably at 0° C. or even lower.

The effectiveness of the tertiary alkoxide as an active component in the present catalyst system is surprising, particularly in view of the teaching against the use of tertiary alkoxides in the Alfin catalyst system as reported in the last paragraph on page 637 of Robert W. Lenz's book on "Organic Chemistry of Synthetic High Polymers," Interscience Publishers, New York (1969), where it is stated, in a discussion of Alfin catalyst systems, "Inactive catalysts are formed with alkoxides of n-propanol, t-pentanol, allyl alcohol and other non-secondary alcohols, . . .

Typical sodium hydrocarbon compounds that can be used as intermediates in the preparation of the sodium allyl compound include compounds in which the hydrocarbon portion is methyl, ethyl, n-propyl, iso-propyl, n-butyl, sec.-butyl, t-butyl, n-amyl, sec.-amyl, t-amyl, n-hexyl, sec.-hexyl, t-hexyl, n-octyl, 1,1,5-trimethyl-pentyl, n-decyl, 1-methyl-2,4-diethylpentyl, phenyl, tolyl, ethylphenyl, naphthyl, methylnaphthyl, benzyl, phenethyl, etc.

The sodium allyl compounds suitable for the purpose of this invention can be represented by the formula $CH_2=CHC(R)_2Na$ wherein R represents hydrogen or an alkyl group of 1–7 carbon atoms. Allyl sodium is the preferred compound but the following derivatives of the allyl compound can also be used: alpha-methyl, alpha, alpha-dimethyl, alpha-ethyl, alpha-isopropyl, alpha,alpha-diethyl, alpha-amyl, alpha-heptyl, alpha,alpha-dipropyl, and the like.

Typical sodium alkoxides that are suitable include those in which the hydrocarbon portions are methyl, ethyl, iso-propyl, n-propyl, n-butyl, sec.-butyl, t-butyl,. n-amyl, sec.-amyl, t-amyl (or 1,1-dimethyl propyl), n-octyl, sec-nonyl, n-decyl, 1,1,4-trimethyl-pentyl, 1 - methyl - 1, 4 - diethyl-pentyl, cumyl, 1-methyl-1-phenyl propyl, and the like.

Typical potassium t-alkoxides that are suitable include those in which the hydrocarbon portions are t-butyl, t-amyl (or 1,1-dimethyl propyl), 1,1,4-trimethyl-pentyl, 1-methyl - 1, 4 - diethyl-pentyl, cumyl, 1-methyl-1-phenyl propyl, etc.

The catalyst is used in a proportion of 0.1 to 4 millimoles per 100 grams of monomer. The polymerization temperature is advantageously no higher than 125° C., and is preferably no higher than 70° C. While higher temperatures can be used, the vinyl content decreases as temperatures exceed 70° C.

Polybutadienes produced at temperatures of 125° C. or lower have molecular weights as high as 1,000,000, generally 100,000 to 500,000. Yields as high as 98–99% are easily produced. The 1,2 configuration in the polymer is at least 35% and generally in the range of 35 to 50% when temperatures not exceeding 70° C. are used. It has been found that desirable wet traction or skid resistance properties require at least 35% 1,2 configuration in the polymers. In contrast corresponding emulsion polymers, which have low glass transition temperatures (—55 to —59° C.), also have poor wet traction properties. These polymers have 20–25% 1,2 configuration and 75–80% trans-1,4.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons preferably of the straight chain variety, such as n-hexane, n-heptane, etc. However, where provision is made for external heat dissipation and temperature control, the solvent can be omitted.

The polymerization is advantageously conducted in a pressure vessel to avoid loss of monomer and solvent, particularly if temperatures are to be used at or above the boiling point of either. Advantageously the polymerization temperature is no higher than 70° C., since higher temperatures give progressively lower vinyl content with increase in temperature.

Conjugated dienes that may be polymerized in accordance with this invention include: 1,3-butadiene, isoprene, chloroprene, 2-phenyl-1,3-butadiene, piperylene, etc.

Although butadiene homopolymers are preferred in the practice of this invention, butadiene copolymers can also be used where the comonomers impart desirable properties and do not detract from the polymer properties. The comonomers are preferably olefins, such as butene-1, n-butene-2, isobutylene, n-pentene-1, n-pentene-2, and the like, and also including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alphamethyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, 1-vinyl-4-chloronaphthalene, 1-isopropenyl-5-chloronaphthalene, vinyl diphenyl, vinyl diphenylethane, 4-vinyl-4'-methyl-diphenyl, 4-vinyl-4'-chlorodiphenyl, and the like. Preferably such comonomers have no more than 12 carbon atoms. Where such comonomers are to be used, generally at least 1%, preferably at least 5% by weight should be used, and as much as 60%, preferably no more than 30% may be used.

In referring above to millimoles of catalyst this corresponds to the millimoles of sodium allyl compound since the catalyst is regarded or at least calculated as a complex of the sodium allyl compound with the other catalyst components.

The "dilute solution viscosity" referred to above is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined from these viscosities and are the number average molecular weights.

SPECIFIC EMBODIMENTS OF THE INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

Example 1

An Alfin catalyst is prepared by the following procedure: dry hexane (660 parts) is charged to a 3-necked flask provided with stirrer, inert gas sweep, a Dry Ice reflux condenser system and an external cooling bath. To this is added 36.8 parts of finely-divided sodium (2 microns maximum particle size) dispersed in xylene. The slurry is cooled to $-10°$ C., and 85.4 parts of dry n-amyl chloride (0.8 mole) is added slowly with moderate stirring which is continued for one hour after the addition has been completed. Then 24 parts of isopropyl alcohol is added slowly. Stirring is then maintained for an additional 45 minutes. Excess dry propylene (C. P. grade) is subsequently introduced into the mixture, the temperature of which is maintained at $-10°$ C. until active reflux of the propylene occurs. The temperature is then raised gradually to 25° C., and the mixture is stirred at this temperature for two hours. During the last 15 minutes the propylene is allowed to leave the system and is collected for recycle. The reaction slurry is transferred to a storage vessel maintained in an inert atmosphere of argon and is then diluted to 1,120 parts with dry hexane. This slurry contains 0.4 mole of sodium isopropoxide, 0.4 mole of allyl sodium, and 0.8 mole of sodium chloride, and is considered to have 0.4 mole of catalyst complex.

Example II

To a moisture-free reactor equipped with stirrer, which has been flushed with dry nitrogen, there is added 433 gm. of a hexane solution containing 100 gm. of butadiene. The solution is stirred for about 10 minutes at 30° C. and 1.528 millimoles of the Alfin catalyst prepared as described in Example I are added with a hypodermic syringe under 50 lbs. of nitrogen pressure at 30° C. The system is immediately closed and the reactor maintained at 30° C. for about 4 hours. The polymer is collected by pouring the mixture into a large amount of methanol containing 20 ml. of an antioxidant such as p-phenylenediamine. The polymer is dried and a yield of 98% of theoretical is obtained. The molecular weight of the polymer is approximately 5,000,000, and the 1,2 repeating unit content is about 20%.

Example III

The procedure of Example II is repeated a number of times each time premixing the Alfin catalyst with a different amount of potassium t-butoxide. The potassium t-butoxide is prepared by the reaction of a suspension of metallic potassium in xylene with a stoichiometric amount of t-butanol in n-hexane. The resulting colloidal suspension is used in varying amounts to give the desired amounts of potassium t-butoxide. The results of the polymerizations and tests on the products are given below in Table I. In each case yields of approximately 100% are obtained.

The control product has poor wet traction compared to the products made with the modified catalyst.

Example IV

Comparative tests are made on a polybutadiene prepared according to Example III using the Alfin catalyst modified by KO-t-Bu (0.89 mole per mole of Alfin catalyst) and a butyl lithium-catalyzed polybutadiene of a type being used commercially for tire production. The polymer produced according to this invention shows a bulk viscosity almost three times as high as the commercial type butyl lithium-catalyzed polybutadiene. However the new polymer shows only slightly higher inherent viscosity measurements than for the commercial type. This information together with the respective molecular weight distribution determinations shows that the polymers of this invention are highly branched. Moreover, the overall processability characteristics of this polymer are better than the corresponding characteristics of the compared commercial type. When the respective polymers are blended respectively in a standard oil recipe and tested with standard laboratory traction devices, the new polymer of this invention registers about 20% improvement over the commercial type on the medium and high coefficient of friction surfaces. The composition with the new polymer has a faster cure rate, which results in a slightly higher modulus and tensile strength and a lower running temperature than the commercial type. The recipe used for the testing composition is: 100 (parts) polymer; 70 ISAF black; 43 oil; 2.5 ZnO; 2.0 stearic acid; 1.0 Santoflex 13; 1.7 sulfur; 1.4 Cyclix B. This is cured for 30 minutes at 300° F. and gives the following test results.

|  | Commercial type | New polymer |
|---|---|---|
| Stanley-London wet skid resistance index: |  |  |
| Surface CF 0.09 | 100 | 100 |
| Surface CF 0.39 | 91 | 108 |
| Surface CF 0.54 | 89 | 112 |
| Young's bending modulus (cured 30 minutes at 300° F.) index—At 10,000 p.s.i., ° C | −71 | −49 |

Example V

The procedures of Examples I through III are repeated with similar results using in place of the sodium allyl equivalent amounts respectively of other sodium allyl compounds as follows:

(a) alpha-methylallyl sodium
(b) alpha,alpha-dimethylallyl sodium
(c) alpha-ethylallyl sodium
(d) alpha-amylallyl sodium
(e) benzyl sodium

Example VI

The procedures of Examples I through III are repeated a number of times using in place of the butadiene an equivalent weight respectievly of:

(a) isoprene
(b) chloroprene
(c) piperylene
(d) 2-phenyl-1,3-butadiene
(e) 75–25 mixture of butadiene and styrene
(f) 70–30 mixture of butadiene and vinyl toluene
(g) 80–20 mixture of butadiene and n-butene-1
(h) 70–30 mixture of butadiene and isoprene
(i) 75–25 mixture of isoprene and n-hexene-1

TABLE I

| Mmoles of Ex. I Alfin cat./100 g. butadiene | Mmoles of KO-t-Bu | Ratio: moles of KO-t-Bu per mole of Alfin catalyst | Mol. wt. | Percent 1,2 | Processibility | Glass trans. temp. ($T_g$, ° C.) |
|---|---|---|---|---|---|---|
| 1.00 | 0 |  | 10,000,000 | 20 | Very poor | −72 |
| 1.00 | 0.18 | 0.18 | 8,000,000 | 44.1 | Poor | −61 |
| 1.00 | 0.28 | 0.28 | 7,000,000 | 42.6 | do | −59 |
| 1.00 | 0.89 | 0.89 | 64,000 | 44.4 | Excellent | −60 |
| 1.00 | 1.7 | 1.7 | 23,000 | 46.2 | do | −60 |
| 0.44 | 1.0 | 2.28 | 50,000 | 45.5 | do | −60 |

Example VII

The procedures of Examples I through III are repeated with similar results using in place of the hexane, an equivalent amount respectively of: benzene, toluene, n-octane, cyclohexane and methylcyclohexane.

Example VIII

Halide-free allyl Na is prepared by the following procedure: To 600 ml. of a hexane solution containing 1 mole of halide-free n-BuLi there is added with stirring and under a nitrogen atmosphere 600 ml. of a cyclohexane solution containing 1 mole of Na t-amyloxide. The n-BuNa precipitate is filtered and washed under nitrogen several times with cyclohexane. This material upon analysis shows only 0.044% Li being present. This n-BuNa is then suspended in 600 ml. of cyclohexane (or hexane) and the container pressurized to 60 p.s.i. with propylene. Halide-free allyl Na is formed and the byproduct butane is diluted with and removed eventually with the excess propylene.

Example IX

A number of 28-ounce polymerization bottles are charged and polymerizations of butadiene effected at 30° C. for 4 hours as in Example III. The charge consists of 60 gm. of butadiene in 260 gm. of hexane solution. This is added to the moisture-free bottle after it has been flushed with nitrogen. The bottle is sealed and brought to a temperature of 30° C. Using the allyl Na prepared in Example VIII, the halide-free catalyst mixture is added under 50 p.s.i. of nitrogen pressure by a hypodermic syringe inserted through the rubber liner in the sealing cap of the bottle. The bottle is rotated for 4 hours in a polymerization bath maintained at 30° C. The catalyst compositions and results are given in the table below. (The specific metal alkoxides (halide free) are available commercially or may be prepared by the addition of the stoichiometric amount of the appropriate alcohol to a mineral oil suspension of the finely divided metal.) A yield of approximately 100% polymer is obtained in each case.

| | Millimoles KO-t-Bu per 100 gms. butadiene [1] | | | |
|---|---|---|---|---|
| | Example IX, halide free | | Example I, with chloride | |
| | .89 mM. | 1.7 mM. | 0.89 mM. | 1.7 mM. |
| Mol. wt | 50,000 | 30,000 | 64,000 | 23,000 |
| Percent 1,2 | 47 | 49 | 44.4 | 46.2 |
| Processibility | Excellent | Excellent | Excellent | Excellent |
| $T_g$, ° C | −57 | −58 | −60 | −60 |

[1] Using 1.00 millimole each of Na allyl and Na isopropoxide.

Example X

The procedure of Example IX is repeated using in place of the KO-t-Bu an equivalent weight of Na isopropoxide so that the total millimoles of Na isopropoxide are 1.89 and 2.7 respectively. The products have molecular weights of approximately 5,000,000 and are therefore difficult to process. In comparison with the results obtained in Example IX, this shows that the effect of the KO-t-Bu is peculiar to that component and is not caused merely by the use of a larger amount of alkoxide.

Example XI

The procedure of Example IX is repeated using 1.0 millimole of Na-O-t-Bu in place of the KO-t-Bu. The molecular weight of the polymer in each case is 4,000,000 and therefore difficult to process.

Example XII

The procedure of Example IX is repeated using equivalent millimoles of K t-amyloxide in place of the KO-t-Bu with the following results:

| | mM. KO-t-Am | |
|---|---|---|
| | 0.89 mM. | 1.7 mM. |
| Mol. wt | 51,000 | 37,000 |
| Percent 1,2 | 49.0 | 44.0 |
| Processibility | Excellent | Excellent |
| $T_g$, ° C | −58 | −60 |

Example XIII

The procedure of Example IX is repeated using 1.0 millimoles of KO-t-Bu and in place of the Na isopropoxide 1.0 millimole of Na n-butoxide in one experiment and 1.0 millimole of Na-t-butoxide in another case. The results are:

| | NaO-n-Bu | NaO-t-Bu |
|---|---|---|
| Mol. wt | 100,000 | 101,000 |
| Percent 1,2 | 62 | 61 |
| Processibility | Good | Good |
| $T_g$, ° C | −50 | −51 |

Example XIV

The procedure of Example IX is repeated using as the monomer a mixture of 75% butadiene and 25% styrene with the results indicated below:

| | 0.89 mM. | 1.7 mM. |
|---|---|---|
| Mol. wt | 60,000 | 24,000 |
| Percent 1,2 | 47 | 50 |
| Processibility | Good | Good |
| $T_g$, ° C | −39 | −34 |
| Percent block | 0 | 0 |

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims:

The invention claimed is:

1. A process for the hydrocarbon solution polymerization of a monomer composition containing at least 70 percent conjugated diene to produce a polymer having at least 35 percent of the diene in the 1,2 configuration and the remainder being predominantly of the trans-1,4 configuration and a molecular weight of about 23,000 to 500,000 comprising the steps of maintaining said monomer composition at a temperature of no more than 70° C. in intimate contact with a catalyst composition consisting essentially of:

(a) a sodium allyl compound having 3–10 carbon atoms;
   (b) a sodium alkoxide of no more than 10 carbon atoms, and
   (c) a potassium tertiary-alkoxide having 1–10 carbon atoms;

the concentration of said catalyst composition being 0.1–4 millimoles of catalyst per 100 grams of said monomer composition, said sodium alkoxide being present in said catalyst composition in a proportion of 0.5–2.5 moles per mole of sodium allyl compound, said t-alkoxide being present in a proportion of 0.4–2.28 mole per mole of sodium allyl compound, said polymerization being conducted for a period of at least one hour.

2. The process of claim 1 in which said catalyst concentration is 0.4–2 millimoles per 100 grams of monomer composition.

3. The process of claim 2 in which said conjugated diene is 1,3-butadiene.

4. The process of claim 2 in which said monomer composition is essentially all 1,3-butadiene.

5. The process of claim 4 in which said sodium allyl compound is sodium allyl.

6. The process of claim 4 in which said polymerization is conducted for at least 10 hours.

7. The process of claim 4 in which said sodium alkoxide is sodium isopropoxide.

8. The process of claim 7 in which said tertiary-alkoxide is potassium t-butoxide.

9. The process of claim 8 in which said proportion of sodium isopropoxide to sodium allyl is approximately two.

10. The process of claim 7 in which said tertiary-alkoxide is potassium t-amyloxide.

11. The process of claim 10 in which said proportion of sodium sec.-alkoxide is approximately two moles per mole of sodium allyl compound.

12. The process of claim 7 in which said polymerization is conducted in n-hexane solution.

13. The process of claim 12 in which said monomer is in n-hexane solution at a concentration of 10–25 percent by weight.

14. The process of claim 1 in which said catalyst composition is present at a concentration of 0.3–1.0 millimoles per 100 grams of said monomer.

15. The process of claim 1 in which said monomer composition is dissolved in a liquid hydrocarbon having a boiling point no higher than 110° C.

16. The process of claim 15 in which said monomer composition is present at a concentration of 10–25 percent by weight.

17. The process of claim 16 in which said liquid hydrocarbon is n-hexane.

References Cited

Alfin Catalysts by Morton, vol. I, pp. 628–638, Encyclopedia of Polymer Science & Tech. (1964), Interscience.

JAMES A. SEIDLER, Primary Examiner

W. F. HAMROCK, Assistant Examiner

U.S. Cl. X.R.

260—83.7; 85.3 R; 252—431 R